Oct. 29, 1968   J. D. PENN   3,408,478

TOOL FOR WELDING THE EDGES OF PLASTIC SHEETS TOGETHER

Filed June 1, 1965

INVENTOR.
JOSEPH D. PENN
BY Angus & Mon
ATTORNEYS.

United States Patent Office 3,408,478
Patented Oct. 29, 1968

3,408,478
TOOL FOR WELDING THE EDGES OF PLASTIC SHEETS TOGETHER
Joseph Dewey Penn, 1314-A E. Harvard St., Glendale, Calif. 91205
Filed June 1, 1965, Ser. No. 460,341
5 Claims. (Cl. 219—229)

ABSTRACT OF THE DISCLOSURE

A tool for welding the edges of superimposed thermoplastic sheets together employs an electric heating wire seated in an open-end slot formed in a support member carried at the end of a handle which houses a battery for energizing the wire. The peripheral edges of a pair of superimposed plastic sheets to be welded are inserted into the slot in contact with each other and with the wire. The wire is energized to raise its temperature to the fusion temperature of the plastic and the tool is drawn along the superimposed edges to form a continuous welded seam.

---

Figure 2:
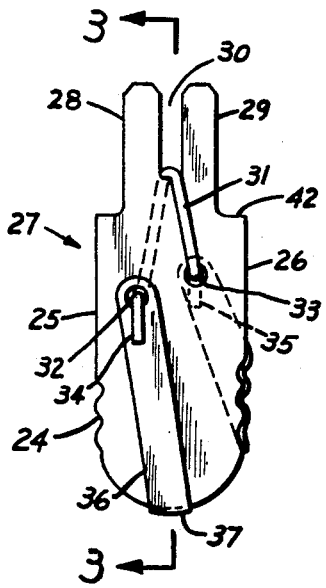

This invention relates to the sealing or welding of plastic materials, and more particularly to the welding together of plastic sheet material.

An object of the invention is to provide a simple, efficient and inexpensive device and method for welding the edges of plastic sheets together, for example, to seal closed the open end of a plastic envelope.

There is a frequent need for rapidly, efficiently and inexpensively sealing plastic envelopes. There is a particular need of this among collectors of coins, stamps, buttons and other similar articles, wherein for the preservation of the article it is a practice to seal such collected articles in individual plastic envelopes. Because of the large number of such articles handled by collectors, the sealing or welding device and operation should be simple and rapid. A number of expedients have been used for the operation. One such expedient involves the use of a hot iron or the like which is pressed against or rubbed over the open end of the envelope to be sealed. Such an arrangement is relatively cumbersome and takes some time in each individual operation. Another expedient has been to supply the envelopes with a sealer; but such seals have not been as effective or as permanent as is desired. Still another such expedient has been the use of envelopes which fold where these openings are to be closed; but obviously this is not a very effective or permanent arrangement.

According to the present invention there is provided a very simple device in the form of a heatable wire extending through a slot formed in a supporting member or frame and adapted to have an electric current passed through it for heating, as for example, by battery power. The arrangement is simple in that it can be mounted in a battery holder such as a small flashlight holder, having a switch for sending the electric current from the battery through the wire. The slot of the wire support is of suitable dimension and width to receive the edges of the plastic sheets or envelope to be sealed or welded together by the action of the hot wire.

A feature of the arrangement resides in the slanting of the wire through the base of the slot so that the wire extends from one edge of the slot over to the other edge in passing from one side to the other of the wire supporting member or frame. This improves the efficiency and effectiveness of the welding operation.

To weld the plastic sheets or sides of the envelope together, the plastic sheets to be welded together are inserted into the slot in contact with each other and with their edges in contact with the wire, while the wire is heated, and the slot is moved relative to the plastic sheets where they are to be joined together. The heat from the wire, acting upon the plastic material in the groove heats the plastic sufficiently to produce the welding. This results in a permanent effective sealing of the envelope.

Figure 3:
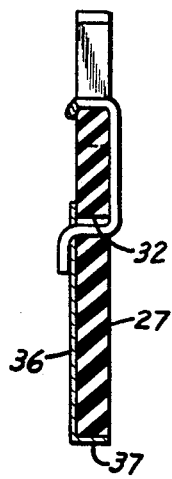
Figure 4:
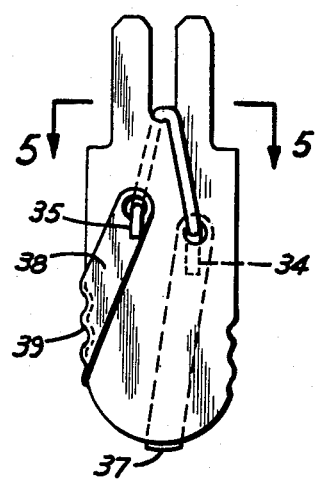
Figure 1:
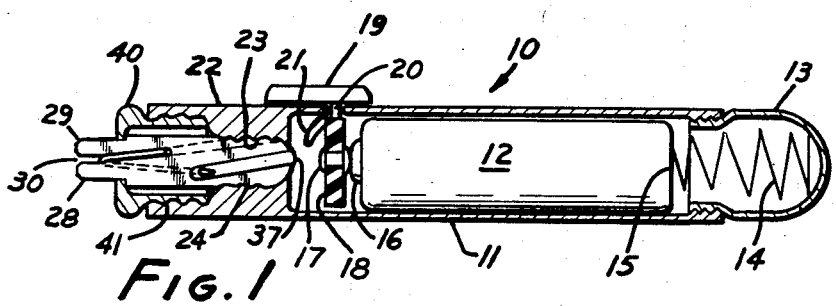
Figures 5, 6, 7:
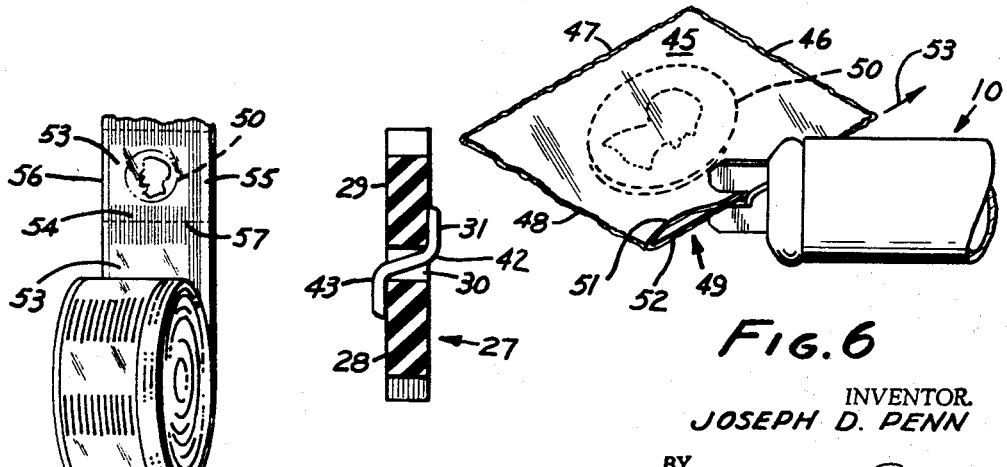

The foregoing and other features of the invention will be better understood from the following detailed description and the accompanying drawing of which:

FIG. 1 is a cross-section view of a sealing device according to the present invention;
FIG. 2 shows a heating element used in the device of FIG. 1;
FIG. 3 is a cross-section view taken at line 3—3 of FIG. 2;
FIG. 4 is a view of the opposite side of the heating element from that shown in FIG. 2;
FIG. 5 is a cross-section view taken at 5—5 of FIG. 4;
FIG. 6 is a view of the heating end of the device of FIG. 1 showing its action of sealing a plastic envelope; and
FIG. 7 shows a rolled strip containing a considerable number of plastic envelopes adapted to be sealed by the device.

Referring to the drawing, there is shown a holder 10 comprising a hollow cylindrical member 11 of a type commonly used for small hand flashlights, containing a battery 12, the cylinder 11 being closed at its rear end by a hollow closure cap 13 threaded to the member 11 and containing a pressure spring 14 which is in contact with the cap and with rear terminal of the battery. Although only one battery cell is shown in FIG. 1, it will be understood that a plurality of cells can be arranged in series within the cylinder. The forward terminal 16 of the battery abuts against the rear portion of an electrically conducting contact element or rivet 17 which passes through an insulating bushing 18 attached to a switch member 19 by an arm or bushing 20 adapted to slide along a spiral groove 21 through the cylindrical wall of member 11 when the handle 19 is rotated around the circumference of member 11. The forward end portion 22 of member 11 is provided with internal threads 23 adapted to receive corresponding threads 24 formed in the opposite edges 25 and 26 of a stiff supporting member or frame of electrically insulating material 27. The supporting member 27 is a thin strip of a stiff material, such as a varnished fiber or cambric of sufficient thickness and rigidity to maintain a sufficiently strong and unbending quality. The member 27 has opposite flat sides and is provided at its forward end with a pair of projections or prongs 28 and 29 spaced by a slot 30 through the base part of which is carried an electrically conducting wire 31 of a material such as Nichrome adapted to be heated by electric current passing through it. The wire is held in position by having its ends brought through respective holes 32 and 33 through the wire support 27 at a position below the slot. One end 34 of the wire is brought flat against the flat side of member 28 just below the hole 32, and the opposite end 35 is brought flat against the opposite side of the support below the hole 33.

A strip 36 of electrical conducting material makes contact with wire end 34 and is brought down over the rear end of the frame 27 to a position 37. Such a strip is preferably applied by application of a metallic paint or coating, such as a silver paint, whch covers and adheres to wire end 34 and the surface of member 27 and its rear end. Such a coating can be applied in liquid form and when allowed to dry forms a durable hard connecting strip of good electrical conductivity and sufficient strength to maintain the wire ends in their position against the flat sides of the wire support. It will usually be found preferable to use two coats of the coating, the second coat being applied after the first has dried and hardened. A similar conductive strip 38 also preferably of a metallic paint is brought from a position over and around wire end 35 to a position 39 covering threads 24 at edge 26 of the wire support 27.

It is desired that the diameter of wire 31 be significantly less than the width of slot 30, as shown in FIG. 5 so that the wire in passing from one side of support 27 to the other slants across the slot 30 at the base of the slot instead of passing perpendicularly with reference to the opposite flat sides of the support. This arrangement of the wire in the slot has been found to have an important beneficial effect in the efficiency of the sealing operation. It has been found that where the slot and wire arrangement is such that the wire passes directly through the slot in the direction perpendicular to the flat sides of the wire support, the sides of the envelope at the open end thereof do not weld together as readily or as quickly as when the wire and slot arrangement is as shown in FIG. 5. The particular reason for this is not definitely understood, but it is thought to result from the fact that one of the edges of the envelope passes over wire 31 at region 42 at one side of the slot while the other edge passes over the region 43 of the wire at the other side of the slot. If the wire were not slanted as shown in FIG. 5, the envelope edges might attempt to straddle the wire. Regardless of what actually happens when the wire passes straight through the slot instead of being slanted as in FIG. 5, it has been found that the welding operation is more efficient and effective when the wire is slanted.

The heating element shown in FIGS. 2 to 4 is held within the forward end of the device 10 by threading the threads 24 into the threads 23. A forward closure member in the form of a collar 40 and provided with a sleeve 41 threads into the forward end of member 11 so that the inner flange of collar 40 engages shoulder 42 of the wire support, leaving the prongs 28 and 29 and slot 30 protruding from the forward end of the collar.

The wire 31 is heated by turning switch handle 9 to move member 17 forwardly into contact with end 37, thereby completing the circuit through the battery, through spring member 14 to closure 13 and to the casing 11 and back to the other side of wire 31 at contact 39; the spring, closure 13 and casing being of electrical conductivity, preferably metal, for the purpose. During this movement of members 17 and 18 forwardly, the contact 16 of the battery maintains contact with electrically conductive member 17 by expansion of spring 14 which is maintained in compressive contact between terminal 15 and the inside of cap 13.

FIG. 6 illustrates the sealing or welding of the open end of an envelope 45 of a plastic material such as thin polyethylene sheets or the like; which have the advantage of being transparent to show the article within it. Such an envelope commonly has a square or rectangular shape and is sealed or closed at three sides 46, 47 and 48 and open at side 49. To seal the envelope closed after the insertion of an object within the envelopes, as for example a coin 50, the unsealed edges 51 and 52 are brought against each other and one edge of the envelope is brought into slot 30 so that the edges of the two sheets to be sealed together, make contact with the wire 31 which is now heated by turning on the battery switch. As the envelope is moved through the slot with the edges of the sheets in contact with the wire in this manner, in the direction of arrow 53, relative to the device 10, the heat from the wire causes a welding of the two thin plastic sheets 51 and 52 at the unsealed opening of the envelope, thereby creating a complete and effective seal which will exclude dirt and moisture and the like from within the envelope, and will protect the contents from abrasion and corrosion.

Envelopes like envelope 45 are available in roll form as shown in FIG. 7. Thus, the rolled strip of FIG. 7 comprises a plurality of envelopes each having an area 53 forming the pocket of the envelope, separated by regions 54 between the pocket areas 53, the regions 54 being those where the two side sheets of the envelope are joined and sealed together in manufacture. Similar sealing or continuity occurs during manufacture, along the strip 55 at one side of the strip. Each individual envelope has its opening at 56 at the other side of the strip of envelopes, thus allowing an object such as coin 50 to be placed therein, if desired. Thus, the individual envelopes can be separated from the strip on the roll by cutting through the areas 54 or by tearing along suitably weakened lines 57.

The dimensions of the heating element and its components are not critical. Design dimensions and criteria which have been found suitable are as follows:

Thickness of wire support strip—about 1/16 inch.
Gauge of heating wire (assuming Nichrome)—American wire gauge No. 34 (.0063 inch in diameter).
Length of heating wire between holes 32 and 33—about 1/2 inch.
Width of slot between prongs 28 and 29—about .012 inch.
Length of slot from forward end to base containing wire—about 5/16 inch.

It should be understood that the foregoing dimensions and criteria are not critical and are given by way of example rather than of limitation. It is apparent that dimensions can be varied depending on the size of the element it is desired to build; and it is also apparent that the gauge or dimension of the heating wire is not necessarily limited to that stated above. It will be understood of course, that the gauge and length of the heating wire will be selected in relation to the resistivity of the wire, to produce an appropriate amount of heat at the slot for the welding operation. in dependence on the battery voltage. These variables are of course well within the scope of one skilled in the art.

The invention is not limited to the particular embodiment illustrated in the drawing and described herein, which are given by way of example rather than of limitation; and the invention is only limited by the scope of the appended claims.

What is claimed is:

1. Means for sealing the edges of two sheets of weldable plastic material together, comprising a rigid electrically insulating support, said support having at its forward end a pair of forwardly protruding prongs defining between then a slot for reception of the edges of the sheets, an electrically conductive wire heatable by passage of electric current through it, extending through said slot at its base from one side of the support to another, means securing the ends of said wire to the respective sides of said support, and electrical connection means extending from one wire end to a first contact position on said support and another electrical connection means extending from the other wire end to a second contact position on said support.

2. A means according to claim 1 in which the portion of said wire extending through slot slants from one side of the slot to the other side of the slot in crossing the slot.

3. A means according to claim 1 in which the support has edges which are threaded for reception in a threaded holder, said first contact position is at said threads, the second contact position being away from said threads.

4. A means for sealing the edges of two sheets of weldable plastic material together, comprising a rigid electrically insulating support in the form of a strip of rigid insulating material having opposite flat sides parallel to each other, and having at its forward end a pair of forwardly protruding prongs defining between then a slot for reception of the edges of the sheets, and electrically conductive wire heatable by passage of electric current through it, extending through said slot from one of the flat sides to the other, means securing the ends of said wire to the respective opposite sides of the support, an electrical connector strip extending from one wire end along the respective flat side to a position at an edge of said strip and another electrical connecting strip extending from the other wire end to a second position at an edge of said strip.

5. A device for sealing the edges of two sheets of weldable plastic material together, comprising a battery-containing housing, means at the forward end of said housing comprising a rigid electrically insulating support having at its forward end a pair of forwardly protruding prongs defining between then a slot for reception of the edges of the sheets, an electrically conductive wire heatable by passage of electrical current through it, extending through said slot at its base from one side of the support to another, means securing the ends of the said wire to the respective sides of said support, a pair of contacts on said support, electrical connection means from one of the wire ends to one of the contacts and electrical connection means from the other wire end to the other of the contacts, means attaching the support within the forward end of the housing in a manner to make electrical contact therewith, and switching means comprising a movable contact to connect the other terminal of the battery to the remaining contact on the support.

References Cited

UNITED STATES PATENTS

| | | | |
|---|---|---|---|
| 2,579,088 | 12/1951 | Piazze et al. | 156—579 |
| 2,625,201 | 1/1953 | Smith | 219—243 X |
| 2,780,047 | 2/1957 | Vandamme et al. | |
| 3,095,492 | 6/1963 | Gaiennie | 219—243 |
| 3,213,265 | 10/1965 | Campbell | 156—583 X |

ANTHONY BARTIS, *Primary Examiner.*